March 19, 1929.   M. TOCH   1,706,335
RECEPTACLE FOR PAINTS, ETC
Filed June 3, 1927
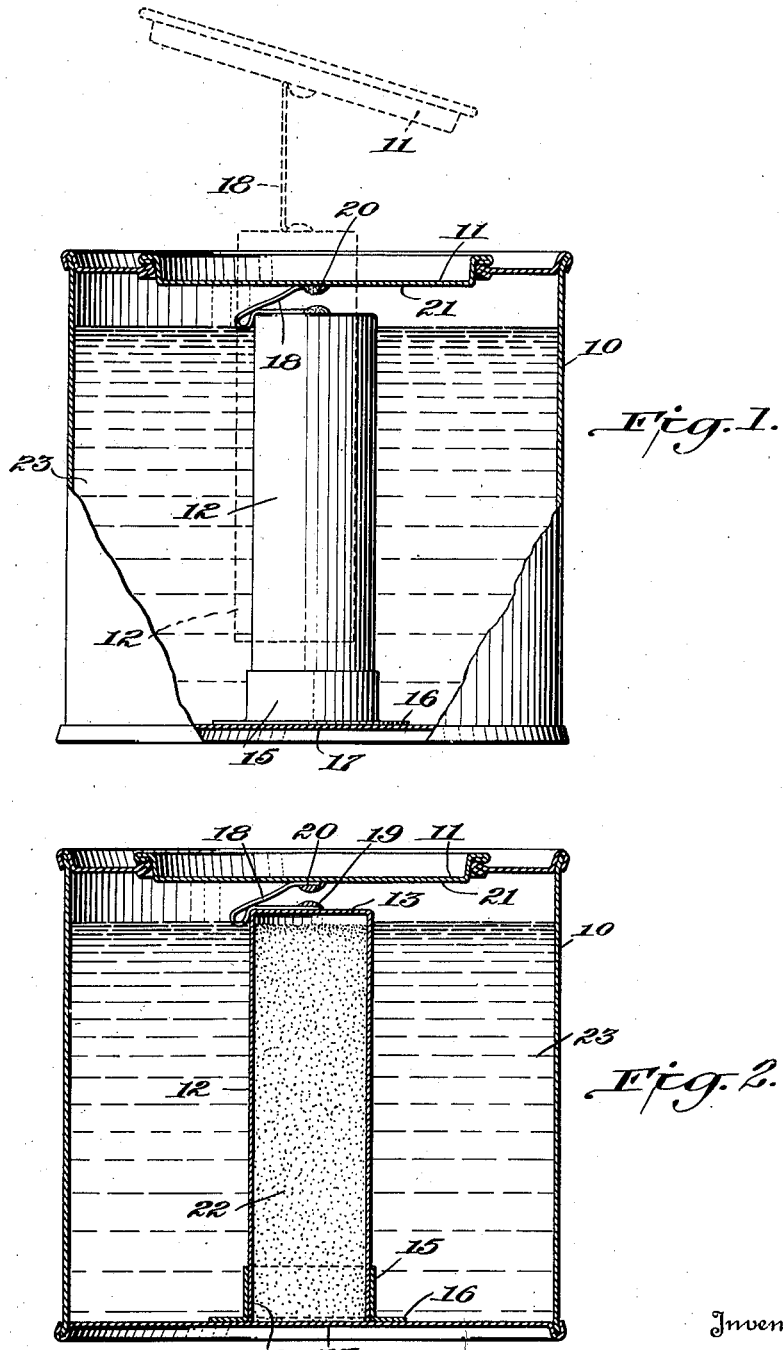
Inventor:
Maximilian Toch,
By Byrnes Townsend Brickenstein,
Attorneys Patented Mar. 19, 1929.

1,706,335

UNITED STATES PATENT OFFICE.

MAXIMILIAN TOCH, OF NEW YORK, N. Y., ASSIGNOR TO STANDARD VARNISH WORKS, OF NEW YORK, N. Y., A CORPORATION OF NEW YORK.

RECEPTACLE FOR PAINTS, ETC.

Application filed June 3, 1927. Serial No. 196,329.

The invention relates to receptacles of the type adapted to contain a plurality of materials which are to be maintained separated until the time of use.

The receptacle of the present invention is especially suitable for the shipment of paints, enamels, bronzing liquids, and similar coating materials, of the kind in which the solid and liquid components must be maintained separated until the coating material is to be used and the receptacle is opened. A typical example of the special use of such a receptacle is for the shipment of aluminum or other metal powder and varnish, which must not be mixed until the coating material is to be applied, since on mixing, hydrogen, which is explosive, is generated.

Numerous means have heretofore been devised for maintaining the materials separated until ready for use. In one of the better known types, a relatively large container is provided for the liquid component, and on the cover or bottom thereof is attached a smaller receptacle, the contents of the latter being dumped into the larger receptacle when the coating composition is to be used. In certain other forms heretofore suggested, a small receptacle for the metal powder is mounted within the larger container, and the contents of the first is discharged into the liquid by fracturing the wall of the smaller container, or by removal of a plug or stopper in the smaller container.

An object of the present invention is to provide a receptacle for the purpose referred to which will be simpler in form and safer and more practical in use, and which has few parts and is less expensive to manufacture than those heretofore known.

My novel receptacle is provided with a septum having liquid-tight engagement with the inner wall of the receptacle, and this septum is separable and withdrawable, upon removal of the closure of the receptacle, and thereupon permits mixing of the ingredients.

The invention may take any of several forms. In this application I have shown an embodiment wherein the receptacle comprises an outer container and a septum which takes the form of an inner container, the latter being removably secured to the inside, for example the bottom, of the outer container and having liquid-tight engagement therewith. Upon removal of the inner container the contents thereof are discharged into the outer container, and the ingredients of the coating composition may therefore be mixed.

The septum or inner container may be of cylindrical form. Preferably it is somewhat cartridge-shaped; and it is removably attached along the free or open end to the bottom or other inner wall of the outer container. This is accomplished preferably by providing an upstanding collar on the bottom of the outer container and slidably mounting the inner container on this collar, that is, within or on the outside of the collar. Also, I preferably connect the closure of the receptacle with the inner container, so that when the closure is removed from the receptacle and the coating composition is to be used, the inner container is withdrawn from the collar and the contents of such inner container becomes discharged into the larger container.

The embodiment referred to is illustrated in the accompanying drawing, wherein:

Fig. 1 is a vertical section of the receptacle showing the inner container and the closure in place for shipment, etc., and, in dotted lines, the receptacle and closure in removed position; and Fig. 2 is a vertical section somewhat similar to Fig. 1, but showing also the inner container in section. The receptacle here shown comprises an outer container 10, which may be of any well-known form, a closure 11 which may conveniently be of the slip-cover type, and a cartridge-shaped septum providing an inner container 12. The upper end 13 is closed while the open lower end 14 has a liquid-tight engagement with an upstanding collar 15 secured, as by means of a flange 16, to the inside of the bottom 17 of the outer container, by soldering, spot-welding or the like.

The lower end of the inner container and the collar 15 fit so snugly that an effective seal is provided to exclude the liquid in one container from the contents of the other container, but in the preferred form it is not so firmly attached as to prevent removal of the inner container by forcibly sliding the same from the collar. If the inner container is more permanently secured to the collar 15 or to the bottom directly, it is desirable to reduce the thickness of the material of the container at or near the lower end, or the material of the collar, or both, to facilitate fracture and severing of the inner container from the outer when the contents are to be mixed for use.

A short strap 18 of stout but flexible material is secured at one end 19 to the closed end 13 of the inner container, while the other end 20 is secured to the under side 21 of the closure 11, by any appropriate means.

Fig. 2 illustrates the receptacle with the parts in place for shipment, etc., the inner container 12 being filled with one component 22, for example metal powder, and the outer container being filled with another component 23, for example varnish or similar liquid. When the coating or other composition is to be used, the closure is pried off in the usual manner and when lifted from the receptacle, as shown in dotted lines in Fig. 1, removes with it the septum 12. Since the latter is open at its bottom the contents of the inner container thereupon discharges freely into the larger receptacle and the components may be stirred together in the usual way.

I claim:

1. A receptacle for coating materials of the type wherein the liquid component must be maintained separated from the solid component during shipping, etc., comprising an outer container having a collar on the inside of its bottom, an inner container closed at its upper end and open at its lower end, said inner container being mounted, slidably but liquid-tight, at its open end within said collar, a closure for the receptacle, and means connecting the upper end of said inner container and said closure whereby when the latter is removed the inner container is slid from said collar to discharge the contents thereof into said outer container.

2. A receptacle for a plurality of materials to be maintained separated during shipping, storing, etc., and to be mixed for use, comprising an outer container, an inner container detachably secured to the inside of said outer container, a cover for said outer container, and a slack connection between said cover and said inner container for detaching the latter and discharging its contents upon substantial separation of the cover from said outer container.

3. A receptacle for coating-materials of the type wherein the liquid component must be maintained separated from the solid component during shipping, etc., comprising an outer container having a collar on its inner wall, an inner container closed at one end and open at its other end, said inner container being fixed, slidably but liquid-tight, at its open end to said collar, a closure for the receptacle, and means connecting the closed end of said inner container and said closure whereby when the latter is removed the inner container is slid from said collar to discharge the contents thereof into said outer container.

In testimony whereof, I affix my signature.

MAXIMILIAN TOCH.